No. 834,633.　　　　　　　　　　　　　　PATENTED OCT. 30, 1906.
B. NEUBURGER & K. WITZ.
CEMENT.
APPLICATION FILED JULY 28, 1906.
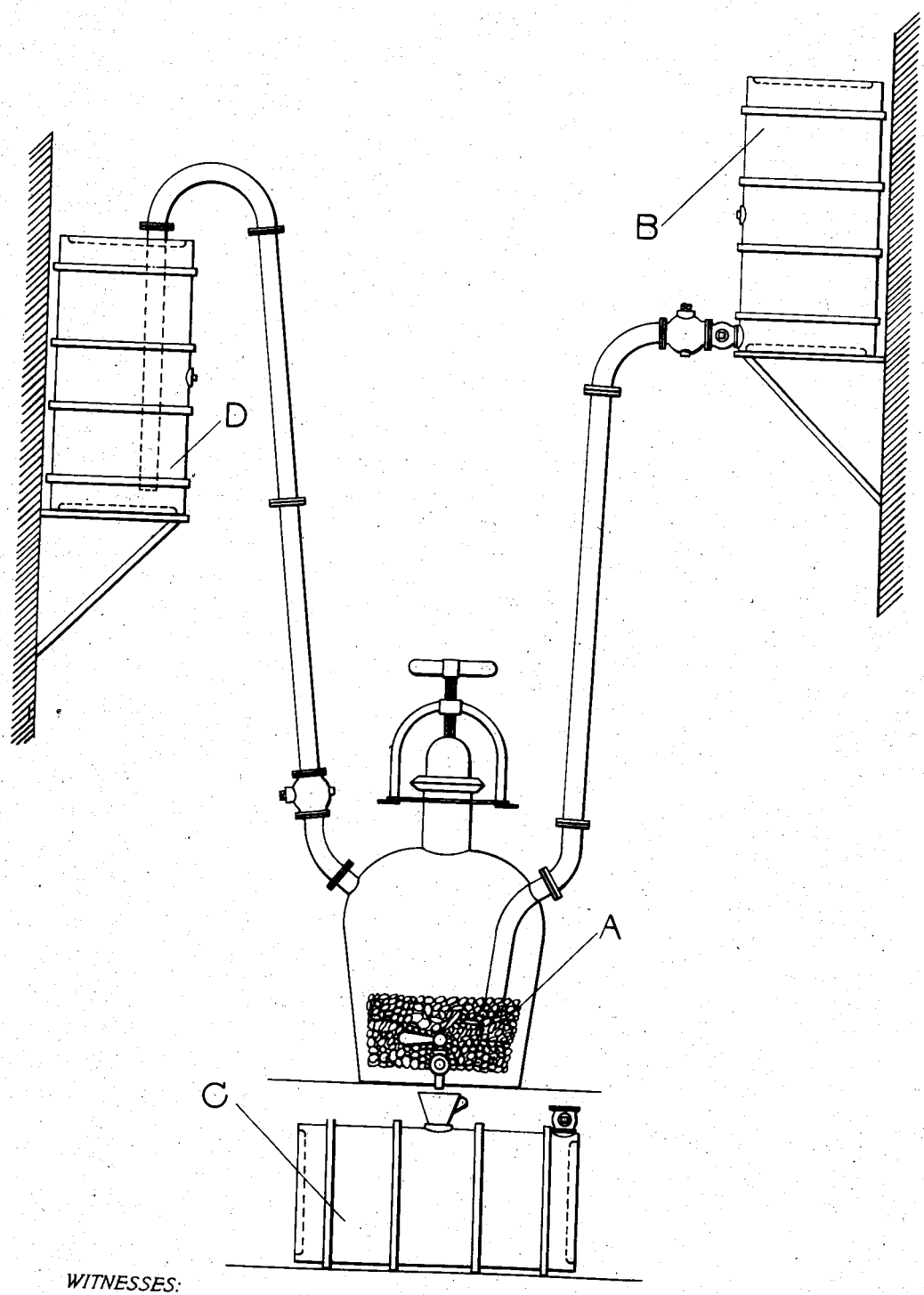
WITNESSES:　　　　　　　　　　　　　　　　　　INVENTORS.

UNITED STATES PATENT OFFICE.

BERNHARD NEUBURGER AND KONRAD WITZ, OF NUREMBERG, GERMANY; SAID WITZ ASSIGNOR TO SAID NEUBURGER.

CEMENT.

No. 834,633.

Specification of Letters Patent.

Patented Oct. 30, 1906.

Application filed July 28, 1906. Serial No. 328,255.

*To all whom it may concern:*

Be it known that we, BERNHARD NEUBURGER and KONRAD WITZ, of Nuremberg, in the Kingdom of Bavaria, Germany, have invented certain new and useful Improvements in Cements, of which the following is a specification.

This invention relates to the manufacture of cements, and particularly to a method of making an improved weatherproof cement.

Heretofore in the art a weatherproof cement of the type known as "sorel-cement" has been obtained free from sodium salts by adding hydrochloric acid to magnesite, thereby obtaining a solution of chlorid of magnesium and adding magnesia thereto.

According to the present invention hydrochloric acid is added to magnesite and to the solution of magnesium chlorid thus obtained carbonic-acid gas is added until the solution is saturated. In this way by subsequently adding magnesia carbonate of magnesium can be obtained. This method is of particular importance, for the reason that the solution of chlorid of magnesium being saturated with carbonic-acid gas the magnesia upon being added to the said solution is acted upon not merely in a superficial manner, but a thorough chemical reaction is effected, whereby a cement of superior quality is obtained.

In the practice of this invention the apparatus illustrated in the accompanying drawing may be advantageously employed.

In the vessel $a$ magnesite is caused to react with hydrochloric acid, the latter being taken from the vessel $b$. The carbonic acid liberated by the reaction is conducted into the receptacle $d$, which contains a solution of chlorid of magnesium. The solution of chlorid of magnesium which is produced in the vessel $a$ is passed into the receptacle $c$ and this is exchanged for the vessel $d$ when the latter is emptied.

By means of the solution of chlorid of magnesium saturated with carbonic acid present in the receptacle $d$ carbonate of magnesia is obtained by the addition of magnesia, whereby a weatherproof cement of superior quality is produced.

Having thus described our invention, what we claim, and desire to secure by Letters Patent, is—

The process of producing weatherproof cement which consists in reacting upon magnesite with hydrochloric acid, adding carbonic-acid gas to the liquid residue until the latter is saturated and finally adding magnesia to the saturated liquid, substantially as described.

In testimony whereof we affix our signatures in presence of two witnesses.

BERNHARD NEUBURGER.
KONRAD WITZ.

Witnesses:
OSCAR BOCK,
HEINRICH FIETH.